United States Patent
Shima et al.

(10) Patent No.: US 7,557,695 B2
(45) Date of Patent: Jul. 7, 2009

(54) METER DRIVING DEVICE

(75) Inventors: Osamu Shima, Niigata (JP); Yousuke Maruyama, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 295 days.

(21) Appl. No.: 11/587,931

(22) PCT Filed: Apr. 11, 2005

(86) PCT No.: PCT/JP2005/007009
§ 371 (c)(1),
(2), (4) Date: Oct. 26, 2006

(87) PCT Pub. No.: WO2005/103629
PCT Pub. Date: Nov. 3, 2005

(65) Prior Publication Data
US 2008/0157949 A1    Jul. 3, 2008

(30) Foreign Application Priority Data
Apr. 26, 2004    (JP) ............................ 2004-130245

(51) Int. Cl.
*B60Q 1/00*    (2006.01)

(52) U.S. Cl. ................................................ 340/438

(58) Field of Classification Search ................. 340/438, 340/995.14, 426.15, 995.17, 995.18, 995.27; 116/47, 62.1
See application file for complete search history.

(56) References Cited

U.S. PATENT DOCUMENTS

| | | | | |
|---|---|---|---|---|
| 5,578,985 | A | * | 11/1996 | Cremers et al. ............. 340/461 |
| 5,741,058 | A | * | 4/1998 | Suzuki et al. ................ 362/27 |
| 7,015,986 | B2 | * | 3/2006 | Brandt et al. ................ 349/58 |
| 7,126,564 | B2 | * | 10/2006 | Schach et al. .............. 345/75.1 |

FOREIGN PATENT DOCUMENTS

| | | |
|---|---|---|
| JP | 8-240444 A | 9/1996 |
| JP | 2000-46588 A | 2/2000 |
| WO | WO 02/056275 | 7/2002 |

* cited by examiner

*Primary Examiner*—Phung Nguyen
(74) *Attorney, Agent, or Firm*—McDermott Will & Emery LLP

(57) ABSTRACT

A meter driving device 1 includes a meter (a combination meter) 6 including state display units (first and second analog display units and a digital display unit) 6b, 6c, and 6d that display vehicle states, control means (first control means and second control means) 4a and 6a for inputting state signals indicating the vehicle states, calculating vehicle state data on the basis of the state signals, and causing the state display units 6b, 6c, and 6d to operate on the basis of the vehicle state data, and storing means (a memory card) 4b for storing the vehicle state data and data other than the vehicle state data during a predetermined time in synchronization with each other.

12 Claims, 4 Drawing Sheets

METER DRIVING DEVICE

Related Application

This application is the U.S. National Phase under 35 U.S.C. § 371 of International Application No. PCT/JP2005/007009, filed on Apr 11, 2005, which in turn claims the benefit of Japanese Application No. 2004-130245, filed on Apr 26, 2004, the disclosures of which Applications are incorporated by reference herein.

TECHNICAL FIELD

The present invention relates to a meter driving device that displays vehicle states using a state display unit such as a running speed of a vehicle and an engine speed using an analog display unit or a digital display unit.

BACKGROUND ART

Conventionally, as a vehicle meter, there are, for example, a meter mounted as a combination meter including a speedometer, a tachometer (a TA meter), a temperature gauge, a fuel gauge, and the like, and a manifold pressure gauge (a boost gauge), an exhaust temperature indicator, or a fuel pressure indicator that is often mounted on a vehicle running in a circuit and the like and a vehicle with a supercharger or a turbocharger. Such meters detect various vehicle states using various sensors, an ignition pulse (a TA pulse), a speed pulse (a SP pulse), and the like and display the various vehicle states using a state display unit such as an analog display unit or a digital display unit.

In such meters, in particular, meters included in a vehicle running in a circuit or the like, in order to grasp a running state in a race, a meter capable of storing vehicle states during a predetermined time or causing the state display unit to operate to reproduce and display the vehicle states in the past stored is desired.

Thus, the applicant has proposed, in a Patent Document 1, a meter driving device that detects vehicle states and displays the vehicle states using state display units, the meter driving device including storing means for storing, for a predetermined time, data for causing the state display units to perform a display operation according to the vehicle states and including reproducing means for causing the state display units to perform a display operation according to the data stored in the storing means.

According to the meter driving device disclosed in the Patent Document 1, a user can visually check vehicle states in the past at the time of running in the same manner as a usual operation and, in particular, can review driving of the user in a race and examine improvement of a race time by storing the vehicle states during a predetermined time in a time trial, a circuit race, or the like and reproducing the vehicle states. The user can grasp running characteristics of a vehicle such as engine performance at the time of running and obtain information for adjusting vehicle components such as an engine.

Patent Document 1: JP-A-2000-46588

DISCLOSURE OF THE INVENTION

Problems that the Invention is to Solve

However, in the meter driving device that has a function of storing the vehicle states during the predetermined time, only measurement data indicating the vehicle states is stored. The user has to recall other kinds of information such as a course on which the vehicle ran during the predetermined time, a steering angle of a steering wheel, and the like and supplement a running state of the vehicle with a memory of the user. There is a room of improvement for a function of obtaining data for reflecting on driving of the user and adjusting vehicle components.

In view of the improvement, it is an object of the invention to further improve a meter driving device that has a function of storing vehicle states during a predetermined time when a vehicle runs and provide a meter driving device that allows a user to check a running state of the vehicle during the predetermined time in detail later.

Means for Solving the Problems

In order to solve the problems, a meter driving device according to the invention is characterized by including state display units that display vehicle states, control means for inputting state signals indicating the vehicle states, calculating vehicle state data indicating measurement values of the vehicle states on the basis of the state signals, and causing the state display units to operate on the basis of the vehicle state data, and storing means for storing the vehicle state data and data other than the vehicle state data during a predetermined time in synchronization with each other.

The meter driving device is characterized by further including first control means serving as the control means for inputting the state signals, calculating the vehicle state data on the basis of the state signals, and transmitting the vehicle state data and second control means serving as the control means for receiving the vehicle state data and causing the state display units to operate according to the vehicle state data.

The meter driving device is characterized in that the control means is provided such that vehicle information data, which is not usually displayed by the state display units, can be inputted thereto and the storing means stores the vehicle information data during the predetermined time as the other data.

The meter driving device is characterized in that the control means is provided such that image data indicating images around the vehicle can be inputted thereto and the storing means stores the image data during the predetermined time as the other data.

The meter driving device is characterized in that the control means is provided such that map data and position data of the vehicle can be inputted thereto and the storing means stores the map data and the position data during the predetermined time as the other data.

The meter driving device is characterized in that the control means is provided such that environment data indicating an environment around the vehicle can be inputted thereto and the storing means stores the environment data during the predetermined time as the other data.

The meter driving device is characterized by further including a housing section that removably houses the storing means.

The meter driving device is characterized in that the control means includes a transmitting unit that is capable of transmitting the vehicle state data and the other data stored in the storing means to other devices.

The meter driving device is characterized by further including operating means that has a single operation switch or plural operation switches and that the control means causes the storing means to store the vehicle state data and the other data on the basis of predetermined operation of the operating means.

The meter driving device is characterized in that the control means is provided such that a magnetism detection signal from magnetism detecting means for detecting magnetism of a magnet embedded in a road surface can be inputted thereto and causes the storing means to store the vehicle state data and the other data according to an input of the magnetism detection signal.

The meter driving device is characterized by further including operating means that has a single operation switch or plural operation switches and in that the control means causes the state display units to operate on the basis of the vehicle state data stored in the storing means on the basis of predetermined operation of the operating means.

The meter driving device is characterized in that the control means is provided to be connectable to a display device and causes the display device to display information based on the other data stored in the storing means in synchronization with operations of the state display units.

Effects of the Invention

The invention relates to a meter driving device that displays vehicle states such as a running speed of a vehicle and an engine speed using a state display unit such as an analog display unit or a digital display unit. It is possible to further improve a meter driving device that has a function of storing vehicle states during a predetermined when the vehicle runs. A user can check a running state of the vehicle during the predetermined time in detail later.

DESCRIPTION OF REFERENCE NUMERALS AND SIGNS

Figure 1:
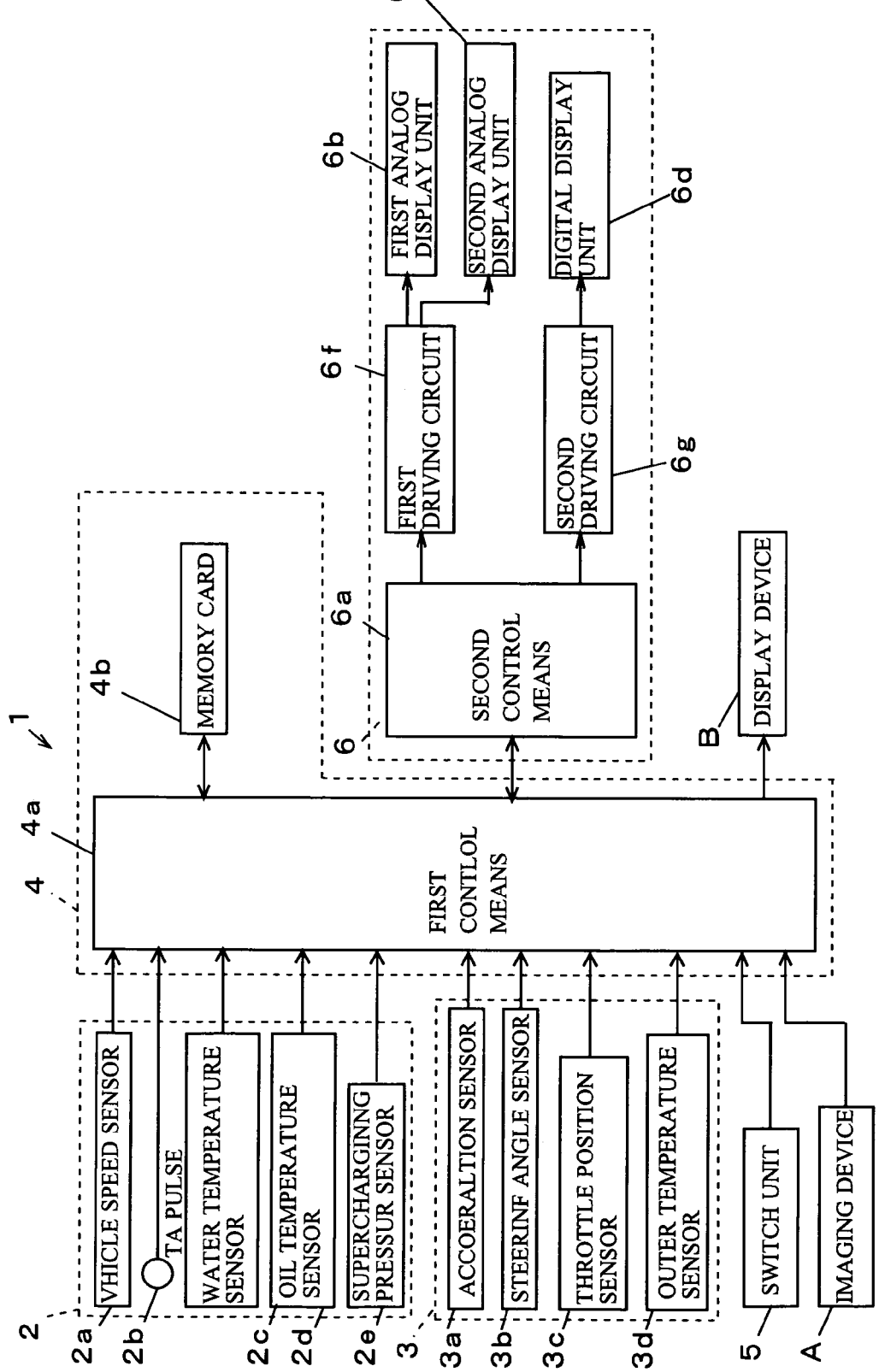
FIG. 1 is a block diagram showing an electric structure of a meter driving device according to an embodiment of the invention.

1 Meter driving device
2 First inputting means
2a Vehicle speed sensor
2b Signal line
2c Water temperature sensor
2d Oil temperature sensor
2e Supercharging pressure sensor
3 Second inputting means
3a Acceleration sensor
3b Steering angle sensor
3c Throttle position sensor
3d Outdoor temperature sensor,
4 Control unit
4a First control means (Control means)
4b Memory card (Storing means)
4c Unit case
4d Card slot
5 Switch unit (Operating means)
5a Switch case
5b Push button switches
6 Combination meter (meter)
6a Second control means (Control means)
6b First analog display unit (State display unit)
6b1 Pointer
6b2 Analog indicator unit
6c Second analog display unit (State display unit)
6c1 Pointer
6c2 Analog indicator unit
6d Digital display unit (State display unit)
6e Meter case
6f First driver
6g Second driver
6h Dial plate
A Imaging device
B Display device

BEST MODE FOR CARRYING OUT THE INVENTION

An embodiment of the invention will be hereinafter explained on the basis of the attached drawings.

Figure 2:
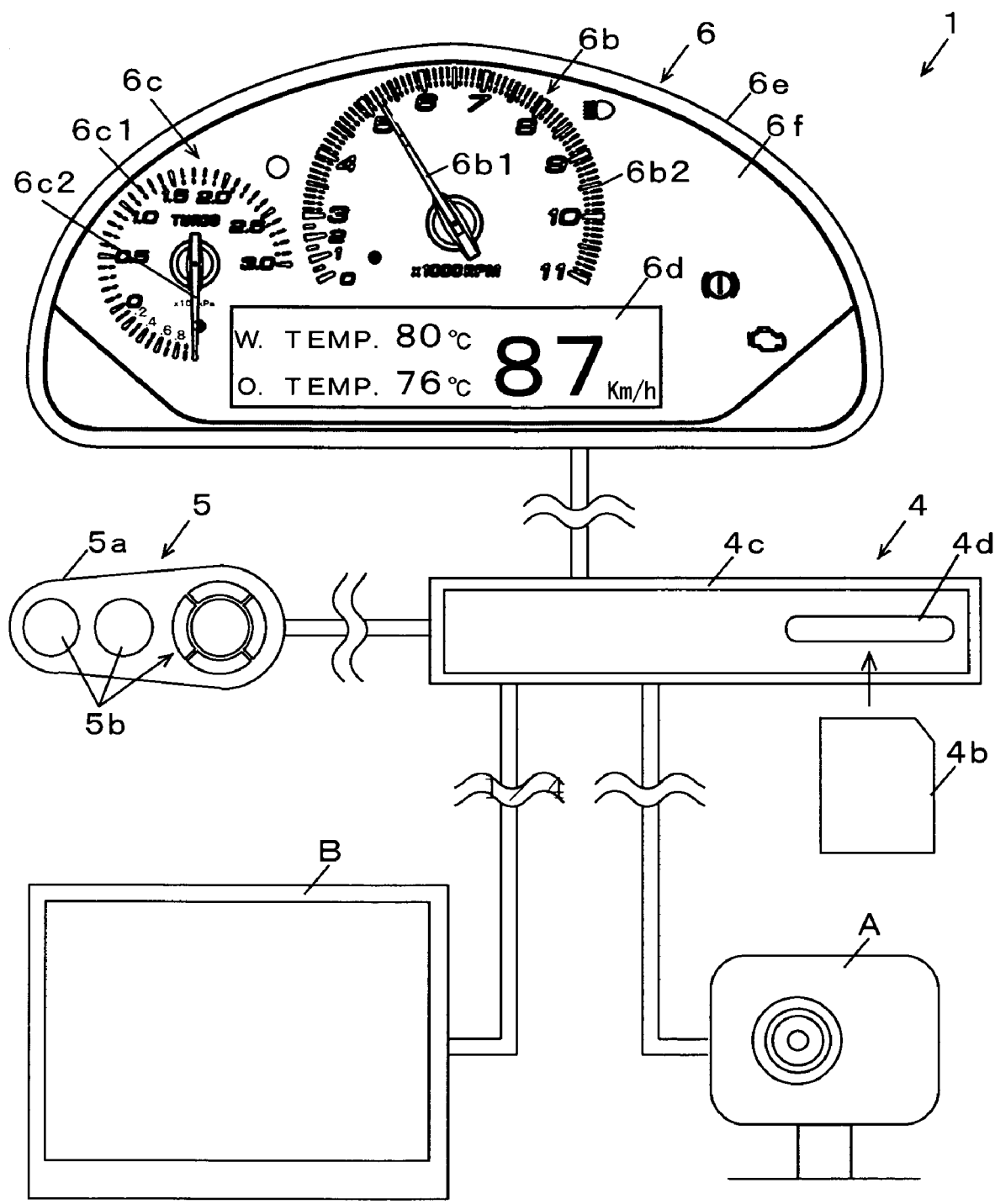
FIG. 2 is a diagram showing an external appearance of the meter driving device.

FIG. 1 shows an electric structure in a meter driving device 1. FIG. 2 shows an external appearance of the meter driving device 1.

The meter driving device 1 mainly includes first inputting means 2, second inputting means 3, a control unit 4 that has first control means (control means) 4a and a memory card (storing means) 4b, a switch unit (operating means) 5, and a combination meter 6 that has second control means (control means) 6a, a first analog display unit 6b, a second analog display unit 6c, and a digital display unit 6d.

The first inputting means 2 includes various sensors and a signal line for detecting vehicle states to be displayed in the first and second analog display units 6b and 6c and the digital display unit 6d, namely, a vehicle speed sensor 2a, a signal line 2b for inputting a pulse signal (hereinafter referred to as TA pulse) from an ignition coil, a water temperature sensor 2c, an oil temperature sensor 2d, and a supercharging pressure sensor 2e. The first inputting means 2 outputs respective state signals indicating the vehicle states to the first control means 4a.

The second inputting means 3 includes various sensors for detecting information other than the vehicle states, namely, an acceleration sensor 3a, a steering angle sensor 3b, a throttle position sensor 3c, and an outdoor temperature sensor 3d. The second inputting means 3 outputs respective detection signals to the control means 4. The acceleration sensor 3a, the steering angle sensor 3b, and the throttle position sensor 3c detect, as the other information, vehicle information other than the vehicle states usually displayed in the combination meter 6. The acceleration sensor 3a detects acceleration applied to the vehicle during running. The steering angle sensor 3b detects an angle of steering wheel operation of the vehicle. The throttle position sensor 3c detects an angle of a throttle valve of an engine that changes according to operation of an accelerator. The outdoor temperature sensor 3d detects an outdoor temperature, which is an environment around the vehicle, as the other information.

In the control unit 4, as shown in FIG. 2, the first control means 4a and the memory card 4b are housed in a unit case 4c made of a resin material or the like. The memory card 4b is disposed to be removably insertable into a card slot (a housing section) 4d formed in the unit case 4c. The control unit 4 includes a connecting section (not shown) for connecting the control unit 4 to an imaging device A such as a CCD camera, which is disposed on a dashboard of the vehicle and photographs an image in front of the vehicle, and a display device B such as a liquid crystal display. The control unit 4 is connected to the imaging device A and the display device B. In this embodiment, it is also possible that a connecting section for connecting the control unit 4 to a cellular phone with a camera is provided in the control unit 4, a CCD camera included in the cellular phone is used as the imaging device A, and a display section, which is capable of reproducing a moving image, included in the cellular phone is used as the display device B.

The first control means 4a consists mainly of a microcomputer. The first control means 4a includes an inputting unit that inputs the respective state signals from the first inputting means 2 or the detection signal from the second inputting means 3, a CPU that executes a predetermined processing operation program, a ROM having stored therein the processing operation program or the like, a RAM that temporarily stores data or the like processed by the CPU, a storing unit consisting of an EEPROM, a backup RAM, or the like that stores data such as a setting value concerning a display function of the combination meter 6 in a nonvolatile manner, and a transmitting unit that transmits the data calculated by the CPU at a predetermined period. When the respective state signals from the first inputting means 2 are inputted, the first control means 4a performs predetermined arithmetic processing according to the respective state signals and calculates respective vehicle state data, which is measurement data of the vehicle state, converts the respective vehicle state data into serial data, and transmits the serial data to the second control means 7. When the respective detection signals from the second inputting means 3 are inputted, the first control means 4a performs predetermined arithmetic processing according to the respective detection signals and calculates (inputs) vehicle information data (acceleration data, throttle position data, and steering angle data), which are measurement data of the vehicle information, and environment data (outdoor temperature data.) indicating an environment around the vehicle. Image data is inputted to the first control means 4a from the imaging device A. As a method of inputting image data, it is also possible that an image signal is inputted to the first control means 4a from the imaging device A and the first control means 4a generates image data indicating an image photographed by the imaging device A on the basis of this image signal.

The first control means 4a has a synchronous storage function for causing the memory card 4b to store the respective measurement data and the other data during a predetermined time in synchronization with each other. "The other data" indicates data other than the respective vehicle state data for causing the first and the second analog display units 6b and 6c and the digital display unit 6d of the combination meter 6 to display the vehicle states. In this embodiment, the other data indicates the vehicle information data, the environment data, and the image data. The first control means has a synchronous reproduction function for causing the first and the second analog display units 6b and 6c and the digital display unit 6d of the combination meter 6 to perform display operations on the basis of the respective measurement data stored in the memory card 4b according to the synchronous storage function and causing the display device B to display information other than the vehicle states on the basis of the other data in synchronization with the display operations.

The memory card 4b is small storing means having a flash memory capable of writing and reading data provided in a case body. As shown in FIG. 2, the memory card 4b is disposed removably insertable into the card slot 4d and connected to the first control means 4a. The memory card 4b stores the respective measurement data and the other data in synchronization with each other according to writing processing of the first control means 4a.

In the switch unit 5, as shown in FIG. 2, plural push button switches 5b are disposed in a switch case 5a made of a resin material or the like. The switch unit 5 is a switch unit for switching display content of the digital display unit 6d of the combination meter 6, deciding start or end of an operation of a storage function, setting a storage time in the storage function, deciding start or end of an operation in a reproduction function, or the like.

As shown in FIG. 2, the combination meter 6 has the second control means 6a, the first analog display unit 6b, the second analog display unit 6c, and the digital display unit 6d provided in the meter case 6e made of a resin material or the like. The combination meter 6 is set on the dashboard of the vehicle, a steering wheel column cover, or the like. A display surface side of the combination meter 6 is covered with a cover body (not shown) made of a translucent resin material or the like.

The second control means 6a consists mainly of a microcomputer including a CPU, a ROM, and a RAM. The second control means 6a has a receiving unit that receives the respective vehicle state data transmitted from the first control means 4a, outputs a driving signal to the first and the second analog display units 6b and 6c via a first driver 6f on the basis of the respective vehicle state data received to cause the first and the second analog display units 6b and 6c to perform display operations indicating the vehicle states, and outputs a driving signal to the digital display unit 6d via a second driver 6g to cause the digital display unit 6d to display the vehicle states.

As shown in FIG. 2, the first and the second analog display units 6b and 6c have pointers 6b1 and 6c1 and analog indicator units 6b2 and 6c2. Comparative reading of the pointers 6b1 and 6c1 and the analog indicator units 6b2 and 6c2 allows the user to read the vehicle states. In this embodiment, the first analog display unit 6b displays an engine speed in a range of 0 rpm to 11000 rpm as the vehicle states. The second analog display unit 6c displays a supercharging pressure of the engine in a range of −80 kPa to 300 kPa as the vehicle states. The respective pointers 6b1 and 6c1 rotate via rotation shafts of a driving body (not shown) consisting of a stepping motor and a cross coil. The respective analog indicator units 6b2 and 6c2 are printed and formed on a dial plate 6h and have plural indicators consisting of scales, numbers, and the like and provided in a substantially arcuate shape.

The digital display unit 6d consists of, for example, an organic EL display. As shown in FIG. 2, the digital display unit 6d displays the plural vehicle states according to number display. In FIG. 2, a running speed of the vehicle, a water temperature, and an oil temperature are displayed as the vehicle states. The vehicle states displayed on the digital display unit 6d can be switched according to predetermined operation of the switch unit 5 by the user.

The meter driving device 1 according to the invention is constituted by the units described above.

Figure 3:
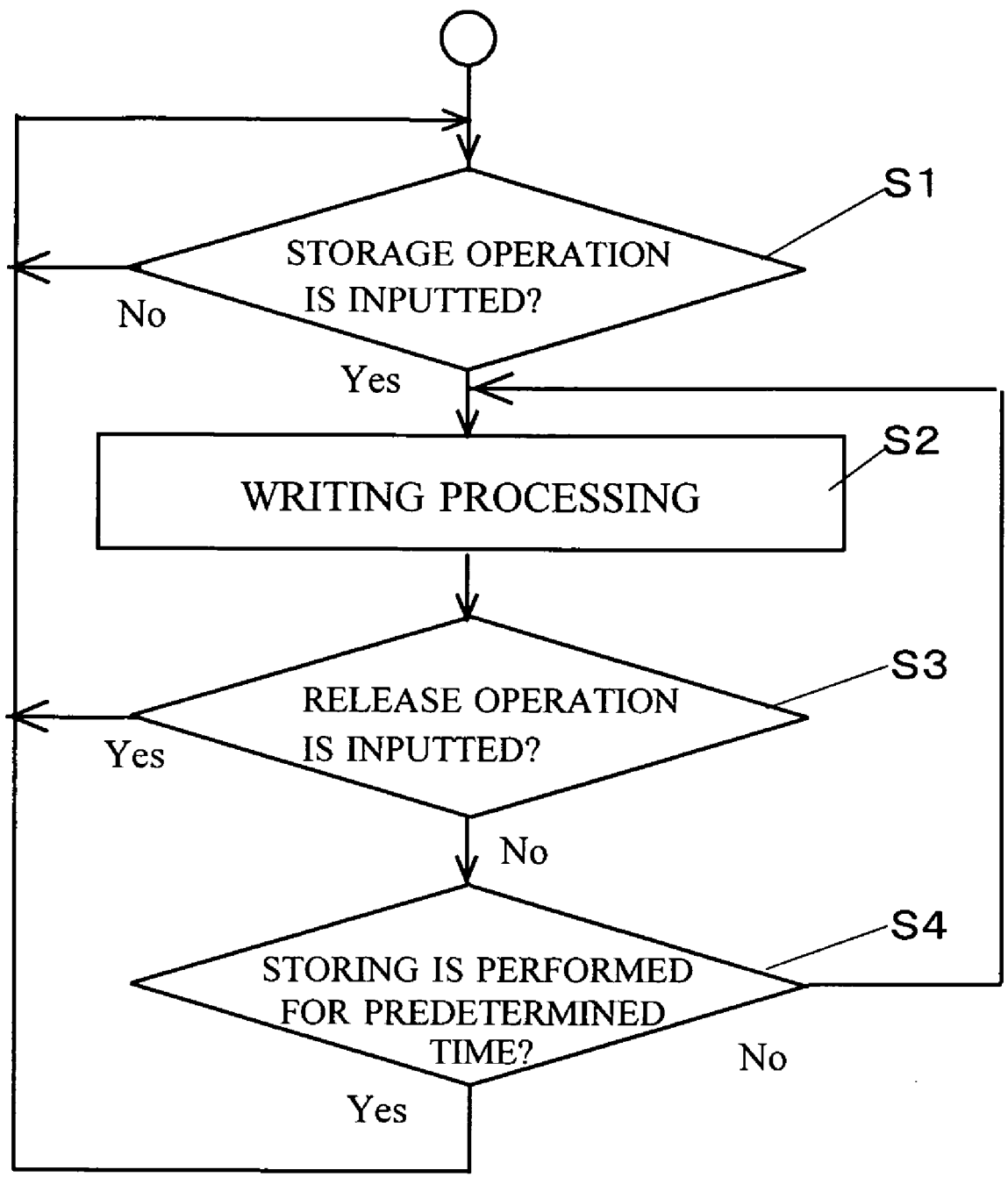
FIG. 3 is a diagram showing a control method in a synchronous storage function of the meter driving device.

A method of driving the meter driving device 1 in the synchronous storage function will be explained using FIG. 3.

In a usual operation mode, the first control means 4a is inputted with the respective state signals from the first inputting means 2, calculates the respective vehicle state data according to the respective state signals, and transmits the respective vehicle state data to the second control means 7. The second control means 4a causes the first and the second analog display units 6b and 6c and the digital display unit 6d to perform display operations for displaying the vehicle states according to the respective vehicle state data received. The first control means 4a judges in step S1 whether predetermined storage operation for starting the synchronous storage function of the switch unit 5 is inputted. When the storage operation is not inputted, the first control means 4a continues the usual operation mode. When the storage operation is inputted, the first control means 4a shifts to step S2.

The first control means 4a continues the usual operation mode and performs, in step S2, writing processing for writing the respective vehicle state data and the other data calculated during a predetermined time in the memory card 4b in synchronization with each other.

The first control means 4a judges in step S3 whether predetermined release operation for releasing the synchronous storage function of the switch unit 5 is inputted. When the release operation is inputted, even if the predetermined time has not elapsed, the first control means 4a suspends the writing processing and releases the synchronous storage function.

When the release operation is not inputted in step S3, the first control means 4a judges in step S4 whether the writing processing has been performed for the predetermined time. When the predetermined time has not elapsed, the first control means 4a continues the writing processing. When the predetermined time has elapsed, the first control means 4a ends the writing processing and releases the synchronous storage function.

By performing the processing described above, the first control means 4a can cause the memory card 4b to store the other data during the predetermined time in synchronization with a change with time of the respective vehicle state data during the predetermined time.

Figure 4:
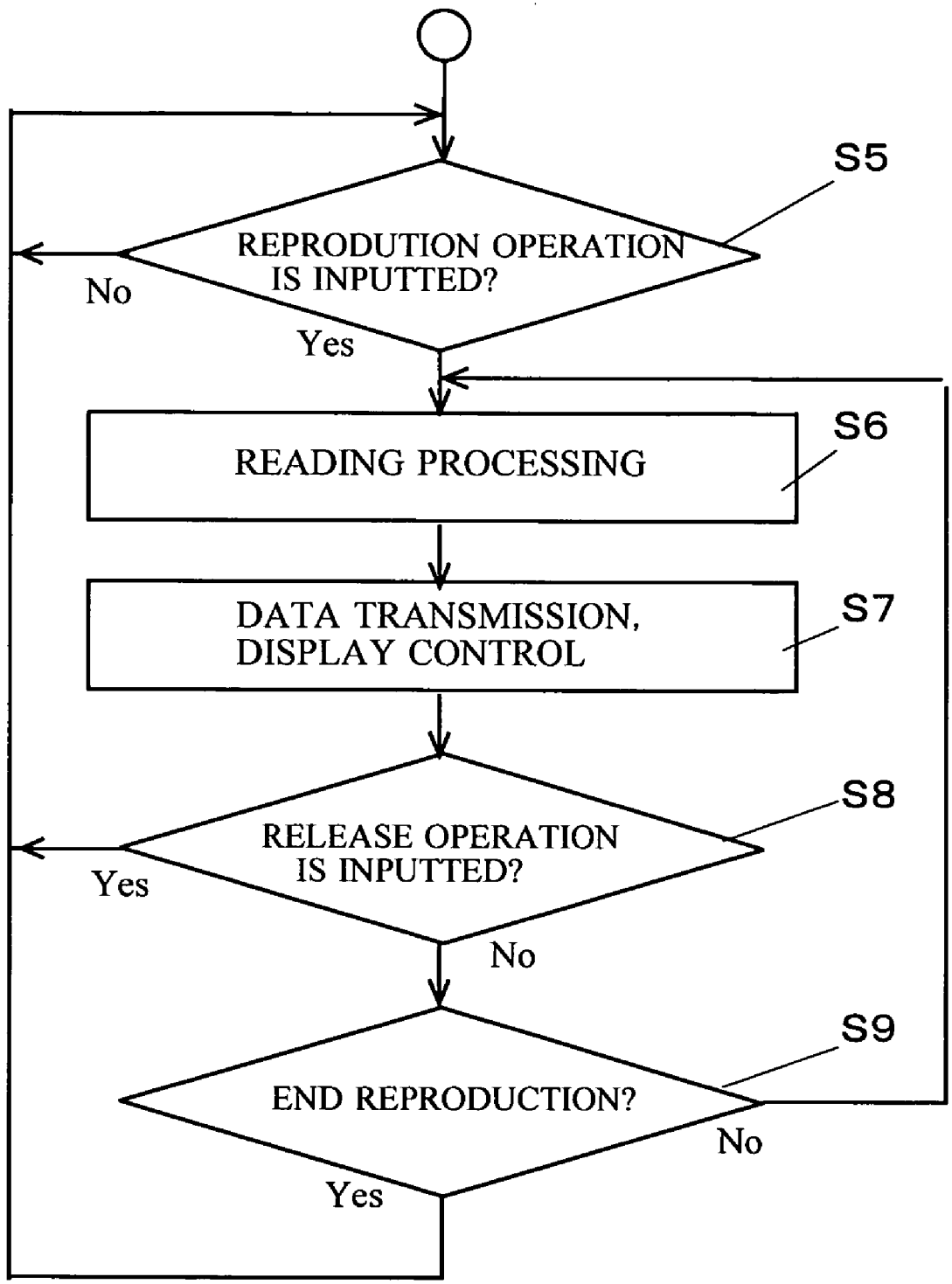
FIG. 4 is a diagram showing a control method in a synchronous reproduction function of the meter driving device.

A method of driving the meter driving device 1 in the synchronous reproduction function will be explained using FIG. 4.

In the usual operation mode, the first control means 4a is inputted with the respective state signals from the first inputting means 2, calculates the respective vehicle state data according to the respective state signals, and transmits the respective vehicle state data to the second control means 6a of the combination meter 6. The second control means 4a causes the first and the second analog display units 6b and 6c and the digital display unit 6d to perform a display operation for displaying the vehicle states according to the respective vehicle state data received. The first control means 4a judges in step S5 whether predetermined reproduction operation for starting the synchronous reproduction function of the switch unit 5 is inputted. When the reproduction operation is not inputted, the first control means 4a continues the usual operation mode. When the reproduction operation is inputted, the first control means 4a shifts to step S6.

In step S6, the first control means 4a releases the usual operation mode and performs reading processing for reading the respective vehicle state data and the other data stored in the memory card 4b.

Moreover, the first control means 4a transmits the respective vehicle state data read from the memory card 4b to the second control means 4a of the combination meter 6 (step S7). The second control means 4a causes the first and the second analog display units 6b and 6c and the digital display unit 6d to perform reproduction operations for displaying the vehicle states in the past according to the respective vehicle state data received. The first control means 4a causes the display device B to display information based on the other data in synchronization with the reproduction operations of the first and the second analog display units 6b and 6c and the digital display unit 6d. In this embodiment, acceleration applied to the vehicle, a throttle position, a steering angle of a steering wheel, an outdoor temperature, and an image in front of the vehicle are reproduced and displayed on the display device B.

The first control means 4a judges in step S8 whether predetermined release operation for releasing the synchronous reproduction function of the switch unit 5 is inputted. When the release operation is inputted, even before all the vehicle state data and the other data stored in the memory card 4b are read or transmitted, the first control means 4a suspends the reading processing and transmission of the data, releases the synchronous reproduction function, and shifts to the usual operation mode.

When the release operation is not inputted in step S8, the first control means 4a judges in step S9 whether all the vehicle state data stored in the memory card 4b have been transmitted. When all the vehicle state data have not been transmitted, the first control means 4a continues the reading processing, the transmission processing, and the display control for the display device B. When all the vehicle state data have been transmitted, the first control means 4a ends the reading processing, the transmission processing, and the display control for the display device B to release the synchronous reproduction function and shifts to the usual operation mode.

By performing the processing described above, the first control means 4a can cause the combination meter 6 and the display device B to reproduce and display information based on the other data in synchronization with a change with time of the respective vehicle states during the predetermined time in the past.

Such a meter driving device 1 includes the combination meter 6 having the first and the second analog display units 6b and 6c and the digital display unit 6d that display the respective vehicle states, the first control means 4a that inputs the respective state signals indicating the respective vehicle states, calculates the respective vehicle state data on the basis of the respective state signals, and transmits the respective vehicle state data, the second control means 6a that receives the respective vehicle state data and causes the first and the second analog display units 6b and 6c and the digital display unit 6d to operate according to the respective vehicle state data, and the memory card 4b that stores the respective vehicle state data and the data other than the respective vehicle state data during the predetermined time. The meter driving device 1 further includes the switch unit 5 that has the plural operation switches 5b. The first control means 4a causes the memory card 4b to store the respective vehicle state data and the other data on the basis of the storage operation of the switch unit 5.

According to the constitution described above, the meter driving device 1 can obtain various kinds of information concerning a running state of the vehicle in the past by causing the memory card 4b to store, together with the vehicle states such as a running speed of the vehicle, an engine speed, and a supercharging pressure displayed by the combination meter 6, the data other than the vehicle states in synchronization with the vehicle states. This allows the user to check a running state of the vehicle during the predetermined time in detail later.

The first control means 4a is provided such that the vehicle information data, which is not usually displayed by the combination meter 6, can be inputted thereto. The memory card 4b stores the vehicle information data during the predetermined time as the other data. Therefore, it is possible to store vehicle information such as acceleration applied to the vehicle, a throttle position, and a steering angle of a steering wheel during the predetermined time in synchronization with the vehicle states in the past. The user can check in detail in what kind of state the vehicle was in a running state in the past without supplementation by memory of the user. The vehicle information data is not limited to this embodiment and may be, for example, presence or absence of actuation of a brake.

The first control means 4a is provided such that the image data from the imaging device A, which photographs images around the vehicle, can be inputted thereto. The memory card 4b stores the image data during the predetermined time as the other data. Therefore, it is possible to store images of a running course of the vehicle in synchronization with the vehicle states in the past. The user can check in detail in what kind of course the vehicle ran without supplementation by memory of the user. The image to be photographed may be an image on a side of the vehicle or an image behind the vehicle other than the image in front of the vehicle.

The first control means 4a is provided such that the environment data indicating an environment around the vehicle can be inputted thereto. The memory card 4b stores the environment data during the predetermined time as the other data. Therefore, it is possible to store an environment around the vehicle such as an outdoor temperature during the predetermined time. The user can check in detail in what kind of environment of a place the vehicle ran in a running state in the past without supplementation by memory of the user. The environment data is not limited to this embodiment and may be, for example, a state of a road surface (a road surface temperature or whether the road surface is wet) or the weather.

In the meter driving device 1, the portable memory card 4b is used as storing means for storing the respective vehicle state data and the other data. The card slot 4d that stores the memory card 4b to be removable to the outside is provided in the control unit 4. Therefore, it is possible to easily carry out the vehicle states and the other data in the running in the past to the outside. This makes it possible to easily perform copying, storage, and reproduction of the data.

The first control means 4a transmits the vehicle state data stored in the storing means to the second control means 6a on the basis of the reproduction operation of the switch unit 5. The second control means 6a causes the first and the second analog display units 6b and 6c and the digital display unit 6d to perform reproduction operations on the basis of the vehicle state data received. The control means is provided to be connectable to the display device and causes the display device to display information based on the other data stored in the storing means in synchronization with operations of state display units. Therefore, the user can check the vehicle states in the running in the past according to a display operation that is the same as the usual operation of the combination meter 6. This makes it possible to check the vehicle states in the past in a state close to the running in the past. The control means is provided to be connectable to the display device B. Information based on the other data is displayed on the display device B in synchronization with the display operation of the combination meter 6. Thus, it is possible to check information other than the vehicle states simultaneously with the vehicle states in a state closer to the running in the past. This makes it possible to improve merchantability of the meter driving device.

In this embodiment, the meter driving device 1 has the two control means, namely, the first control means 4a that is provided in the control unit 4 as the control means, transmits the respective vehicle state data, and causes the memory card 4b to store the respective vehicle state data and the other data during the predetermined time and the second control means 6a that receives the respective vehicle state data and causes the first and the second analog display units 6b and 6c and the digital display unit 6d of the combination meter 6 to perform display operations. However, the meter driving device set forth in claim 1 of the invention may be a meter driving device that includes single control means for inputting state signals indicating vehicle states, calculating vehicle state data on the basis of the state signals, causing state display units to operate on the basis of the vehicle state data, and causing storing means to store the vehicle state data and data other than the vehicle state data during a predetermined time.

In this embodiment, the control unit 4 that has the first control means 4a and the memory card 4b and the combination meter 6 that has the first and the second analog display units 6b and 6c and the digital display unit 6d are separately provided. However, the meter driving device according to the invention may be a meter driving device in which control means, storing means, and a meter that has state display units are provided in a single case body.

The meter driving device according to the invention is not limited to this embodiment. For example, the invention is also applicable to a meter driving device proposed by the applicant in JP-A-10-183523. Such a meter driving device includes first control means for calculating respective vehicle state data from plural state signals indicating vehicle states and a one-package type meter having one state display unit housed in a signal case body. The first control means converts the respective vehicle state data into serial data and transmits the serial data to second control means housed in the case body. The second control means controls the meter on the basis of the serial data received.

The meter driving device according to the invention may be a meter driving device in which, as set forth in claim 5, control means is connected to, for example, a navigation device, the control means is provided such that map data of running of the vehicle and position data of the vehicle can be inputted thereto from the navigation device, and storing means stores vehicle state data during a predetermined time and the map data and the position data during the predetermined time as the other data in synchronization with each other. Such a meter driving device can store a position of the vehicle on the map data during the predetermined time in synchronization with the vehicle states in the past. A user can check in detail later on the map data what kind of course the vehicle ran in a running state in the past without supplementation by memory of the user.

The meter driving device according to the invention may be a meter driving device that includes, as set forth in claim 8, a transmitting unit that is capable of transmitting, by connecting control means to other devices such as a cellular phone and a personal computer by wire or radio, vehicle state data and other data stored in storing means to the other devices. With such a meter driving device, it is possible to easily carry out the vehicle state data and the other data in the running in the past to the outside. This makes it possible to easily perform copying, storage, and reproduction of the data.

In the meter driving device 1 according to this embodiment, the first control means 4a causes the memory card 4b to store the respective vehicle state data and the other data according to the storage operation of the switch unit 5. However, the meter driving device according to the invention may be a meter driving device in which, as set forth in claim 10, magnetism detecting means for detecting magnetism of a magnet embedded in a road surface located in, for example, a start line of a circuit is provided in a vehicle and control means inputs a lap signal (a magnetism detection signal) from the magnetism detecting means and causes storing means to store vehicle state data and other data in synchronization with each other according to an input of the lap signal. In other words, the control means performs start and release of processing for writing the vehicle state data and the other data in the storing means according to an input of the lap signal. Such a meter driving device can cause the storing means to easily store the vehicle state data and the other data during a predetermined time without performing operation of switches or the like in a circuit or the like. This makes it possible to improve merchantability of the meter driving device.

INDUSTRIAL APPLICABILITY

The invention is applied to a meter driving device that displays vehicle states such as a running speed of a vehicle and an engine speed using a state display unit such as an analog display unit or a digital display unit.

The invention claimed is:

1. A meter driving device, characterized by comprising:
   a meter including state display units that display vehicle states;
   control means for inputting state signals indicating the vehicle states, calculating vehicle state data indicating measurement values of the vehicle states on the basis of the state signals, and causing the state display units to operate on the basis of the vehicle state data; and
   storing means for storing the vehicle state data and data other than the vehicle state data during a predetermined time in synchronization with each other.

2. The meter driving device according to claim 1, characterized by further comprising:
   first control means serving as the control means for inputting the state signals, calculating the vehicle state data on the basis of the state signals, and transmitting the vehicle state data; and
   second control means serving as the control means for receiving the vehicle state data and causing the state display units to operate according to the vehicle state data.

3. The meter driving device according to claim 1, characterized in that
   the control means is provided such that vehicle information data, which is not usually displayed by the state display units, can be inputted thereto, and
   the storing means stores the vehicle information data during the predetermined time as the other data.

4. The meter driving device according to claim 1, characterized in that
   the control means is provided such that image data indicating images around the vehicle can be inputted thereto, and
   the storing means stores the image data during the predetermined time as the other data.

5. The meter driving device according to claim 1, characterized in that
   the control means is provided such that map data and position data of the vehicle can be inputted thereto, and
   the storing means stores the map data and the position data during the predetermined time as the other data.

6. The meter driving device according to claim 1, characterized in that
   the control means is provided such that environment data indicating an environment around the vehicle can be inputted thereto, and
   the storing means stores the environment data during the predetermined time as the other data.

7. The meter driving device according to claim 1, characterized by further comprising a housing section that removably houses the storing means.

8. The meter driving device according to claim 1, characterized in that the control means includes a transmitting Unit that is capable of transmitting the vehicle state data and the other data stored in the storing means to other devices.

9. The meter driving device according to claim 1, characterized by further comprising operating means that has a single operation switch or plural operation switches, and in that
   the control means causes the storing means to store the vehicle state data and the other data on the basis of predetermined operation of the operating means.

10. The meter driving device according to claim 1, characterized in that the control means is provided such that a magnetism detection signal from magnetism detecting means for detecting magnetism of a magnet embedded in a road surface can be inputted thereto and causes the storing means to store the vehicle state data and the other data according to an input of the magnetism detection signal.

11. The meter driving device according to claim 1, characterized by further comprising operating means that has a single operation switch or plural operation switches, and in that
   the control means causes the state display units to operate on the basis of the vehicle state data stored in the storing means on the basis of predetermined operation of the operating means.

12. The meter driving device according to claim 11, characterized in that the control means is provided to be connectable to a display device and causes the display device to display information based on the other data stored in the storing means in synchronization with operations of the state display units.

* * * * *